United States Patent [19]

Carlson et al.

[11] 4,148,454
[45] Apr. 10, 1979

[54] BRACKET ASSEMBLY

[75] Inventors: Reuben E. Carlson; Dagfinn O. Amdal, both of Rockford, Ill.

[73] Assignee: Keystone Consolidated Industries, Inc., Peoria, Ill.

[21] Appl. No.: 907,923

[22] Filed: May 22, 1978

[51] Int. Cl.² .............................................. F16B 12/02
[52] U.S. Cl. .................................. 248/221.3; 312/263; 312/111; 108/152
[58] Field of Search .............. 312/263, 111, 107, 108, 312/140; 248/221.3; 108/152; 403/12, 13, 231

[56] References Cited

U.S. PATENT DOCUMENTS

| 2,864,578 | 12/1958 | Margulis | 248/221.3 |
| 3,113,358 | 12/1963 | Zell et al. | 248/221.3 |
| 3,197,265 | 7/1965 | Rand | 312/263 |
| 3,388,884 | 6/1968 | Eggler et al. | 248/221.3 |
| 3,402,907 | 9/1968 | Fisher | 248/221.3 |
| 3,403,641 | 10/1968 | Baker | 248/221.3 |
| 3,545,712 | 12/1970 | Ellis | 248/221.3 |
| 3,675,955 | 7/1972 | Hajduk | 312/111 |

Primary Examiner—Victor N. Sakran
Attorney, Agent, or Firm—Allegretti, Newitt, Witcoff & McAndrews

[57] ABSTRACT

An improved shelf bracket assembly has identical bracket members. Each bracket member is L-shaped and has a mounting portion forming one leg of the L and a flange portion forming the other portion. The mounting portion has a central raised section with an opening for receipt of a flange portion of the other bracket member. Each flange also includes a dimple and a cantilever finger. The dimple cooperates with the central raised section to maintain the bracket members in an intermediate prelocked condition. The cantilever finger cooperates with the central raised section to maintain the bracket members in a final locked condition.

8 Claims, 7 Drawing Figures

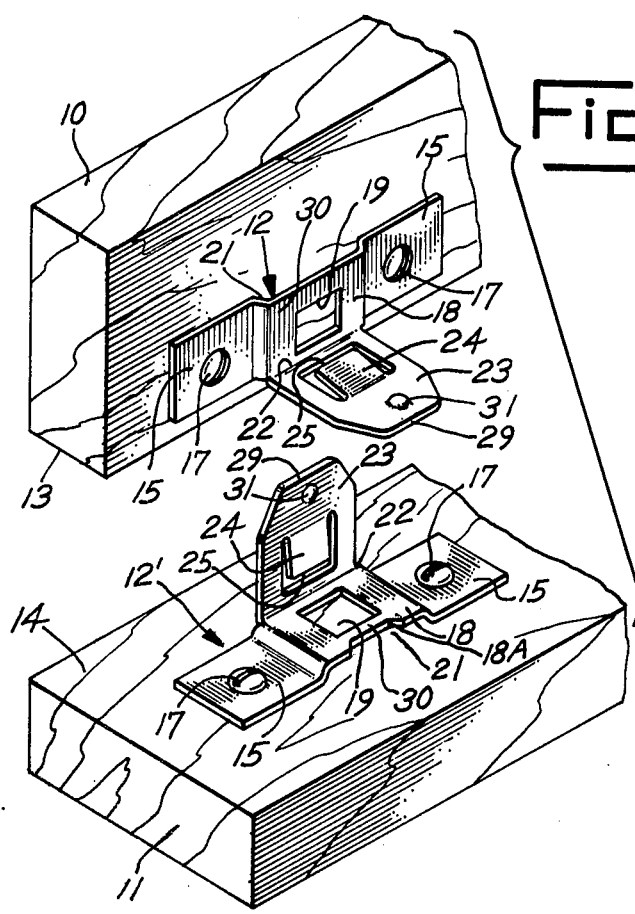
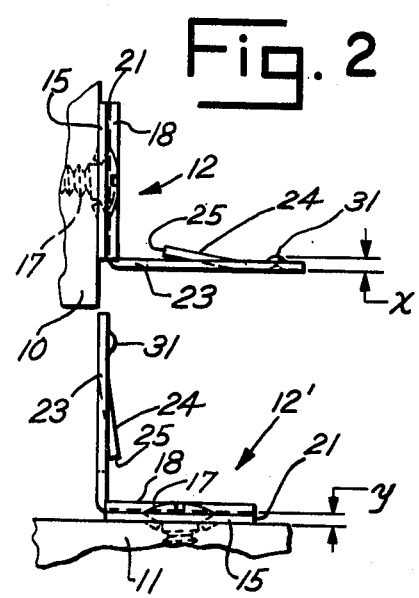
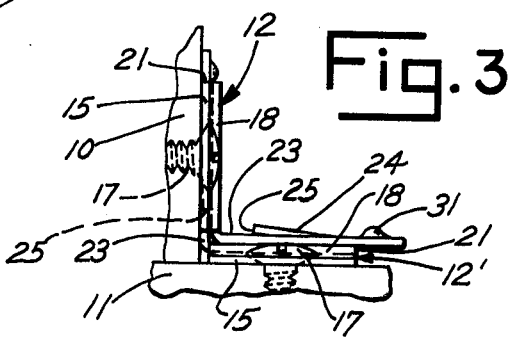
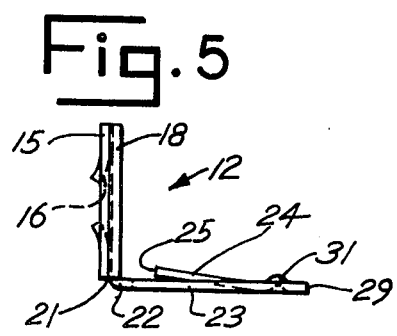
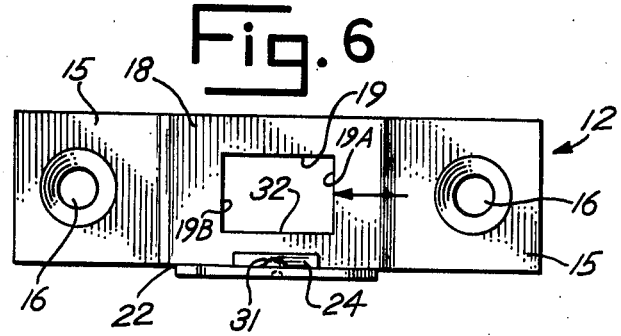
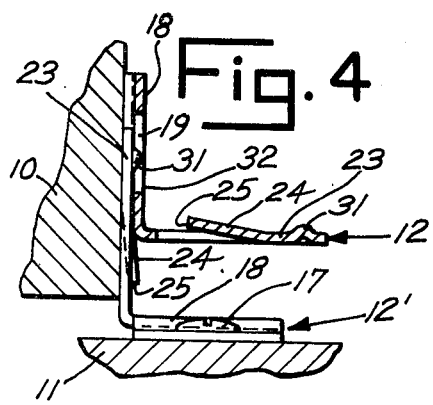
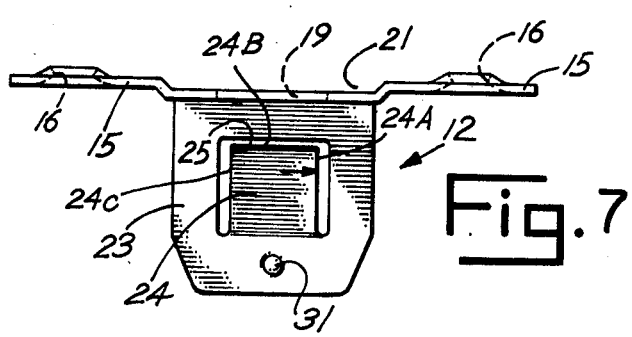

BRACKET ASSEMBLY

BACKGROUND OF THE INVENTION

This invention relates to a bracket assembly and more particularly to the combination of a pair of identical bracket members for use in a cabinet, for shelves or for similar constructions.

The present invention comprises an improvement over the bracket construction shown in U.S. Pat. No. 3,545,712, Assembly Bracket, in the name of Leslie M. Ellis, issued Dec. 8, 1970. That patent is incorporated herewith by reference.

U.S. Pat. No. 3,545,712 discloses an assembly bracket for use in cabinets where a pair of identical bracket members are utilized. One bracket member is reversed relative to the other during assembly. Each bracket member has a mounting portion with a raised central portion provided with an opening. Each bracket also includes a flange with a detent edge which is cooperative with the opening of the central raised portion of the other bracket. The bracket members may be interlocked by positioning the flange of one bracket member within the pocket opening of the other bracket member.

The bracket assembly of the described prior art patent works quite well inasmuch as the bracket members themselves are identical, thus facilitating ease of operation and assembly. The present invention contemplates an improvement of the bracket assembly wherein the bracket members may be assembled in an intermediate, temporary, interlocked state having some freedom of movement so that a series of bracket members may be properly positioned for final locking engagement. This facilitates ease of assembly in complex pieces of furniture having a number of interlocking bracket assemblies.

SUMMARY OF THE INVENTION

The present invention comprises a bracket consisting of a pair of bracket members. Each member has an identical mounting portion and an identical flange integral with the mounting portion and positioned at an angle slightly greater than 90° relative to the mounting portion. The mounting portion includes a central raised portion. Improved detent means on the flange cooperate with the central raised portion to lock a pair of bracket members together. The improved detent means comprise a lateral projection at the outer end of the flange and a flexible locking member positioned inwardly from the lateral projection on the flange.

It is thus an object of the present invention to provide an improved bracket assembly comprised of a pair of bracket members having substantially identical parts.

Another object of the present invention is to provide an improved bracket assembly wherein the assembly includes detent means which permit holding of the bracket assembly in an intermediate, semi-locked position.

Still another object of the present invention is to provide an improved bracket assembly comprised of substantially identical bracket members wherein each of the bracket members includes a flange portion having a cantilever finger which interlocks with an opening in the mounting portion of another bracket member.

Still another object of the present invention is to provide an improved bracket assembly comprised of two bracket members which may be easily formed from sheet metal by stamping procedures. The bracket members are substantially identical and cooperate with each other consequently reducing inventories of parts, providing ease of replacement and ease of assembly.

Further objects, advantages and features of the invention will be set forth in the detailed description which follows.

BRIEF DESCRIPTION OF THE DRAWING

In the detailed description which follows, reference will be made to the drawing comprised of the following figures:

FIG. 1 is an exploded perspective view of two parts of a cabinet structure wherein the improved bracket assembly of the present invention is attached;

FIG. 2 is a side elevation view of the cabinet parts and bracket members prior to assembly;

FIG. 3 is a side elevation view of the assembly bracket members and cabinet parts in the assembled condition;

FIG. 4 is a side elevation view of the bracket assembly members and cabinet parts in a partially assembled or intermediate condition retained in said condition by the improved detent means of the present invention;

FIG. 5 is a side elevation view of a bracket member;

FIG. 6 is a top plan view of a bracket member; and

FIG. 7 is a front elevational view of a bracket member.

DESCRIPTION OF THE PREFERRED EMBODIMENT

FIGS. 1, 2 and 3 disclose cabinet parts 10 and 11 with a pair of attached bracket assembly members 12 and 12'. An edge surface 13 of cabinet part 10 abuts a surface 14 of cabinet part 11. Parts 10 and 11 may be sections of a cabinet, the shelves in a bookcase or any other similar parts construction which are to be attached. The bracket members 12 and 12' are substantially identical in configuration as shown in FIGS. 4–7 and are positioned in opposed relationship to each other for assembly.

Each member 12 and 12' is provided with a mounting portion 30 having mounting wings 15. Each wing 15 has an opening 16 to receive a suitable fastener such as screw 17 to secure the bracket member 12, 12' to the cabinet part 10 or 11. Between the mounting wings 15 is a central raised portion 18 having an enlarged opening 19 therein. The opening 19 is generally rectangular in shape and defines generally parallel spaced sides 19A and 19B. The raised portion 18 in combination with part 10 or 11 forms a pocket 21 defined as the region between the raised portion 18 and the part 10 or 11.

The outer edge of raised portion 18 includes a notch 18A which is opposed to opening 19. The notch 18A is optional and is cooperative with a dimple or projection 31 as described below.

An integral flange 23 is formed along an inner bend or edge 22 of the raised portion 18 so that the included angle between the flange 23 and the raised portion 18 is greater than 90°. The flange 23 includes a projection or dimple 31 positioned at the mid point of the flange 23 along its outer edge 29. The projection 31 extends outwardly from the plane of the flange 23 though it may extend in the opposite sense. The height of the projection 31 is such that the distance from the undersurface of the flange 23 to the top of the projection 31 (distance x in FIG. 2) is the same or slightly greater than the width of pocket 21 (distance y in FIG. 2).

Inwardly from the projection 31 is a cantilever finger 24. The cantilever finger 24 extends toward bend 22 and defines a detent edge 25 which, when the bracket members 12 and 12' are in assembled condition, engages the back edge 32 of opening 19. The cantilever finger 24 is defined by cutting material in the flange 23 along the three sides 24A, 24B, 24C of the finger 24 and then bending the finger 24 outwardly in the same direction as the projection 31. Note that the finger 24 extends outwardly a sufficient distance to engage the edge 32 when the bracket members 12, 12' are in assembled condition. It is thus important that the cantilever finger detent edge 25 extend outwardly substantially the distance y in FIG. 2 in order to assure engagement of the edge 25 with the edge 32. Also, the sides 24A and 24C are generally parallel and spaced from each other to define a dimension less than the dimension between parallel sides 19A and 19B of opening 19. This size relationship permits transverse movement of the assembled bracket members 12, 12' relative to each other or in the direction of the arrows in FIGS. 6 and 7. Such movement may be desirable to accommodate any misalignment of the members 12, 12' as attached to separate cabinet parts 10, 11.

Additionally, the edge 25 is positioned parallel and spaced a distance from the bend 22 and the raised portion 18 to insure a snug fit of the bracket members 12 and 12'. Thus, the bracket member 12' and in particular the detent edge 25 thereof engages the edge 32 as shown in FIG. 3 with the distance between the edge 25 and its associated bend 22 and raised portion 18 sufficient to insure that the flange 23 of bracket 12 will flex against the raised portion 18 of bracket 12'. This arrangement provides a tight, snug fit of the bracket members 12, 12' in their fully assembled condition.

The assembled conditions of the bracket members 12 and 12' are illustrated by FIGS. 3 and 4. FIG. 4 illustrates an intermediate state of assembly wherein the lateral projection 31 fits within the opening 19. FIG. 3 illustrates the final state of assembly wherein the lateral projection is locked in notch 18A and finger 24 is locked in opening 19.

When in the intermediate state of FIG. 4, the dimensions of the projection 31 as previously described, permit the bracket members 12, 12' to be retained in the position shown with some "play" or freedom of movement being permitted. The play is limited by the amount of movement the projection 31 may have within the opening 19. This intermediate stage of assembly becomes important during assembly of cabinet parts having a number of bracket members 12, 12' associated therewith. The cabinet parts may be partially assembled by arranging them in the intermediate assembly condition as illustrated by FIG. 4. The play associated with the intermediate assembly condition of FIG. 4 permits some give during the assembly operation and thus facilitates the assembly operation.

Final assembly may then be effected. The arrangement of the bracket members 12 and 12' during final assembly is illustrated by FIG. 3. The projection 31 is then retained in notch 18A and frictionally holds the assembly together. The notch 18A as well as the dimensional relationship of opening 19 and finger 24 limit transverse movement of members 12, 12' with respect to each other.

In use, the bracket members 12 and 12' are secured in proper alignment on cabinet parts 10 and 11 respectively. Movement of the parts 10 relative to part 11 causes the flange 23 of one bracket member to enter the pocket 21 of the other bracket member. The flange 23 is inserted into the intermediate condition initially as illustrated by FIG. 4. Subsequently, the flange 23 is totally inserted so that the finger 24 engages the opening 19 are previously described. Note that because the flanges 23 are defined as having an angle slightly greater than 90° relative to their associated central raised portion 18, the flanges serve to impart a tension or drawing action to hold the bracket members 12, 12' in a tightly assembled condition. Removal of the bracket members 12, 12' from their interlocked relationship can be effected by depressing the locking finger 25 with an appropriate tool.

While there has been set forth a preferred embodiment of the invention, it is to be understood that the invention shall be limited only by the following claims and their equivalents.

We claim:

1. In a bracket assembly consisting of a pair of bracket members, each member having an identical mounting portion including a pair of mounting wings separated by a central raised portion having an opening therein, each bracket member being mountable on the surface of a part to be assembled and said central raised portion forming a pocket with the surface of the member, each bracket member including an identical planar flange integral with and positioned at an angle slightly greater than 90° relative to said central raised portion, and detent means on said flange for cooperation with the opening and the central raised portion when the flange of one bracket member is received in the pocket of the other bracket member, the improvement of detent means comprising:

a lateral projection from the plane of the planar flange adjacent the outer end of the flange, and a flexible locking member integral with the flange positioned inwardly from the lateral projection whereby the lateral projection of one bracket member provides a temporary, intermediate holding position in cooperation with the central raised portion and opening therein of the other bracket member upon initial insertion of the flange of the one bracket member into the pocket formed by the other bracket member, and the flexible locking member of the one bracket member engages with the central raised portion opening of the other member upon full engagement of the bracket members to provide a final locking position.

2. The improved bracket assembly of claim 1 wherein said lateral projection is a dimple formed in the flange, said dimple defining a width dimension in association with the flange slightly greater than the depth of the pocket formed by a bracket member attached to a panel.

3. The improved bracket assembly of claim 1 wherein said lateral projection is a center dimple projecting from the flange.

4. The improved bracket assembly of claim 1 wherein the flexible raised portion is a cantilever finger integrally fabricated with the flange.

5. The improved bracket assembly of claim 1 wherein said flexible raised portion is a cantilever finger defining an active edge cooperative with a portion of the opening defined in the central raised portion.

6. The improved bracket assembly of claim 1 wherein said flexible raised portion of each bracket member is a finger integrally formed in the flange having a free end cantilevered toward the opening of the bracket member.

7. The improved bracket assembly of claim 6 wherein said finger has a lateral dimension less than the width of the opening whereby the members of an assembly are movable in a transverse direction.

8. The improved bracket assembly of claim 1 wherein said flexible raised portion comprises a cantilever finger having an active edge for cooperation with the opening, said edge being spaced from the associated central raised portion of that bracket a distance such that when the flange of the one bracket member is received in the opening formed by the other bracket member, the flange of the other bracket member yieldingly engages the outer surface of the central raised portion of the one bracket member.

* * * * *